United States Patent
Torii

(10) Patent No.: US 9,953,250 B2
(45) Date of Patent: Apr. 24, 2018

(54) IMAGE PROCESSING APPARATUS AND NON-TRANSITORY COMPUTER READABLE MEDIUM THAT CACHES AND REVISES DATA

(71) Applicant: FUJI XEROX CO., LTD., Tokyo (JP)

(72) Inventor: Takeshi Torii, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/445,198

(22) Filed: Feb. 28, 2017

(65) Prior Publication Data

US 2018/0082159 A1   Mar. 22, 2018

(30) Foreign Application Priority Data

Sep. 20, 2016 (JP) .................................. 2016-183108

(51) Int. Cl.
| | |
|---|---|
| *G06F 15/00* | (2006.01) |
| *G06K 15/00* | (2006.01) |
| *H04N 1/60* | (2006.01) |
| *G06K 15/02* | (2006.01) |
| *G06F 3/12* | (2006.01) |

(52) U.S. Cl.
CPC ......... *G06K 15/1855* (2013.01); *G06F 3/122* (2013.01); *G06F 3/124* (2013.01); *G06F 3/1213* (2013.01); *G06F 3/1243* (2013.01); *G06F 3/1245* (2013.01); *G06F 3/1248* (2013.01); *G06K 15/1813* (2013.01); *G06K 15/1817* (2013.01); *G06K 15/1822* (2013.01); *G06K 15/1836* (2013.01)

(58) Field of Classification Search
CPC ........... G06K 15/1855; G06K 15/1813; G06K 15/1817; G06K 15/1822; G06F 3/1213; G06F 3/122; G06F 3/124; G06F 3/1243; G06F 3/1245; G06F 3/1248
USPC .............................. 358/1.15, 1.14, 1.13, 1.1
See application file for complete search history.

(56) References Cited

U.S. PATENT DOCUMENTS

| | | |
|---|---|---|
| 2010/0241805 A1 | 9/2010 | Ono |
| 2012/0224208 A1 | 9/2012 | Tokumoto |
| | (Continued) | |

FOREIGN PATENT DOCUMENTS

| | | |
|---|---|---|
| JP | 2005-178028 A | 7/2005 |
| JP | 2006-243908 A | 9/2006 |
| JP | 2006-347064 A | 12/2006 |
| | (Continued) | |

*Primary Examiner* — Douglas Tran
(74) *Attorney, Agent, or Firm* — Oliff PLC

(57) ABSTRACT

An image processing apparatus includes a converter, a reuse portion storage unit, and a reuse information output unit. The converter converts page description language (PDL) data into printable data. The converter stores a conversion result of converting an object appearing in the PDL data multiple times into printable data in a storage device and reuses the conversion result for the object which appears after the conversion result has been stored, instead of converting the object into printable data. The reuse portion storage unit stores information indicating a portion of a page image described by the PDL data for which the conversion result has been reused. The reuse information output unit outputs reuse information indicating a portion of the page image for which the conversion result has been reused, by using the information stored in the reuse portion storage unit.

18 Claims, 12 Drawing Sheets

(56) References Cited

U.S. PATENT DOCUMENTS

2012/0293832 A1* 11/2012 Fujita .................... G06F 3/1244
                                                     358/1.15
2014/0154030 A1*  6/2014 Kimura ..................... B42B 4/00
                                                     412/1

FOREIGN PATENT DOCUMENTS

| JP | 2010-046891 A | 3/2010 |
| JP | 2010-221442 A | 10/2010 |
| JP | 2011-228987 A | 11/2011 |
| JP | 2012-183704 A | 9/2012 |
| JP | 2016-009292 A | 1/2016 |

\* cited by examiner

| OBJECT ID | OBJECT NAME | TYPE | ID CODE | DOCUMENT ID | CACHE DATA ADDRESS | CACHE DATA SIZE | USAGE TIMES | PAGE NUMBER IN WHICH CACHE IS USED | PAGE NUMBER IN WHICH CACHE IS NOT USED |
|---|---|---|---|---|---|---|---|---|---|
| 101 | I_I20 | Image | 000000601506D0BF00000000 FAF9CF3F0000060F0C7904 0000000040EFCA82C098E4FF FF9FECFFFF681B000061130 00032CD621950505C5E | 096D4EFFE0A B9443B18C1A 495ABE7B8B | 0000000003930000 | 2,450,938 | 3 | 3, 5, 7 | 1, 2, 4, 6 |
| 102 | F_F234 | Form | 000000601506D0BF00000080 F9F9CF3F000000604B374DC 0000000040EFCA82C098E4FF FF9FECFFFF681B000061130 00032CD621950505C58 | 096D4EFFE0A B9443B18C1A 495ABE7B8B | 0000000003B865FA | 45,322 | 9 | 2, 3, 4, 5, 6, 7, 8, 9, 10 | 1 |
| 103 | I_I20 | Image | 000000A04208D0BF00000040 FAF9CF3F00000080F0C7904 0000000A0DB6291C098E4FF FF9FECFFFF681B000061130 00032CD621950505C5C | 096D4EFFE0A B9443B18C1A 495ABE7B8B | 0000000003B91704 | 1,281,798 | 1 | 7 | 1, 6 |
| 104 | F_F45 | Form | 000000A04208D0BF000000C0 F9F9CF3F000000C057F74CC 0000000209CE790C098E4FFF F9FECFFFF681B00006113000 032CD621950505A40 | 096D4EFFE0A B9443B18C1A 495ABE7B8B | 0000000003CCA60A | 398,612 | 0 | null | 1 |

FIG. 5

| bit 7 | bit 6 | bit 5 | bit 4 | bit 3 | bit 2 | bit 1 | bit 0 |
|---|---|---|---|---|---|---|---|
| CACHE DRAWING | UNUSED | SPOT COLOR | COLOR INFORMATION | | OBJECT TYPE | | |

FIG. 6

| OBJECT TYPE | bit 2 | bit 1 | bit 0 |
|---|---|---|---|
| OTHERS | 0 | 0 | 0 |
| LINE | 0 | 0 | 1 |
| CHARACTER | 0 | 1 | 0 |
| PAINT | 0 | 1 | 1 |
| SHADE | 1 | 0 | 0 |
| TRANSPARENT | 1 | 0 | 1 |
| LOW RESOLUTION IMAGE | 1 | 1 | 0 |
| HIGH RESOLUTION IMAGE | 1 | 1 | 1 |

| bit 7 | bit 6 | bit 5 | bit 4 | bit 3 | bit 2 | bit 1 | bit 0 |
|---|---|---|---|---|---|---|---|
| CACHE DRAWING | 1 | SPOT COLOR | COLOR INFORMATION | OBJECT ID 0 TO 7 ||||

| bit 7 | bit 6 | bit 5 | bit 4 | bit 3 | bit 2 | bit 1 | bit 0 |
|---|---|---|---|---|---|---|---|
| REGION CAUSING CACHING NOT TO BE APPLICABLE | CACHING NOT APPLICABLE | SPOT COLOR | COLOR INFORMATION | | REASON WHY CACHING IS NOT APPLICABLE | | |

FIG. 15

| REASON WHY CACHING IS NOT APPLICABLE | bit 2 | bit 1 | bit 0 |
|---|---|---|---|
| OTHERS | 0 | 0 | 0 |
| SMALL REGION SIZE | 0 | 0 | 1 |
| CACHE SIZE OVERFLOW | 0 | 1 | 0 |
| GRAPHIC STATE | 0 | 1 | 1 |
| WITH SPOT COLOR | 1 | 0 | 0 |
| WITH TRANSPARENCY EFFECT | 1 | 0 | 1 |
| JOB APPEARED FOR THE FIRST TIME | 1 | 1 | 0 |
| CACHE OUT | 1 | 1 | 1 |

IMAGE PROCESSING APPARATUS AND NON-TRANSITORY COMPUTER READABLE MEDIUM THAT CACHES AND REVISES DATA

CROSS-REFERENCE TO RELATED APPLICATIONS

This application is based on and claims priority under 35 USC 119 from Japanese Patent Application No. 2016-183108 filed Sep. 20, 2016.

BACKGROUND

(i) Technical Field

The present invention relates to an image processing apparatus and a non-transitory computer readable medium.

(ii) Related Art

In variable data printing in which some objects are replaced from page to page, specific objects such as forms and photos are usually repeatedly printed on multiple pages. Normally, a job for variable data printing has a large volume, and several tens of thousands of pages of a job is not unusual. It takes a lot of time to execute raster image processing (RIP) for converting page description language (PDL) data of such a large volume of job into data, such as raster data, in a format that can be printed by a printer. Thus, concerning the same object repeatedly used in multiple pages, RIP-processed data concerning this object is cached and reused, thereby reducing the time to execute RIP processing to be shorter than that when this object is RIP-processed every time.

SUMMARY

According to an aspect of the invention, there is provided an image processing apparatus including a converter, a reuse portion storage unit, and a reuse information output unit. The converter converts page description language (PDL) data into printable data. The converter stores a conversion result of converting an object appearing in the PDL data multiple times into printable data in a storage device and reuses the conversion result for the object which appears after the conversion result has been stored, instead of converting the object into printable data. The reuse portion storage unit stores information indicating a portion of a page image described by the PDL data for which the conversion result has been reused. The reuse information output unit outputs reuse information indicating a portion of the page image for which the conversion result has been reused, by using the information stored in the reuse portion storage unit.

BRIEF DESCRIPTION OF THE DRAWINGS

An exemplary embodiment of the present invention will be described in detail based on the following figures, wherein:

FIG. 3 schematically illustrates an example of printing results obtained by performing variable data printing on the two-page invoice shown in FIG. 2;

FIG. 4 illustrates an example of the data content of an object management table;

FIG. 5 illustrates an example of the bit allocation of a tag plate;

FIG. 6 illustrates examples of object types represented in three-bit codes;

FIG. 13 illustrates an example of a job in which a form includes a portion using a spot color;

FIG. 14 illustrates an example of the bit allocation of a tag plate when a portion where caching is not applicable is displayed;

FIG. 15 illustrates examples of reasons represented in three-bit codes why caching is not applicable;

DETAILED DESCRIPTION

Figure 1:
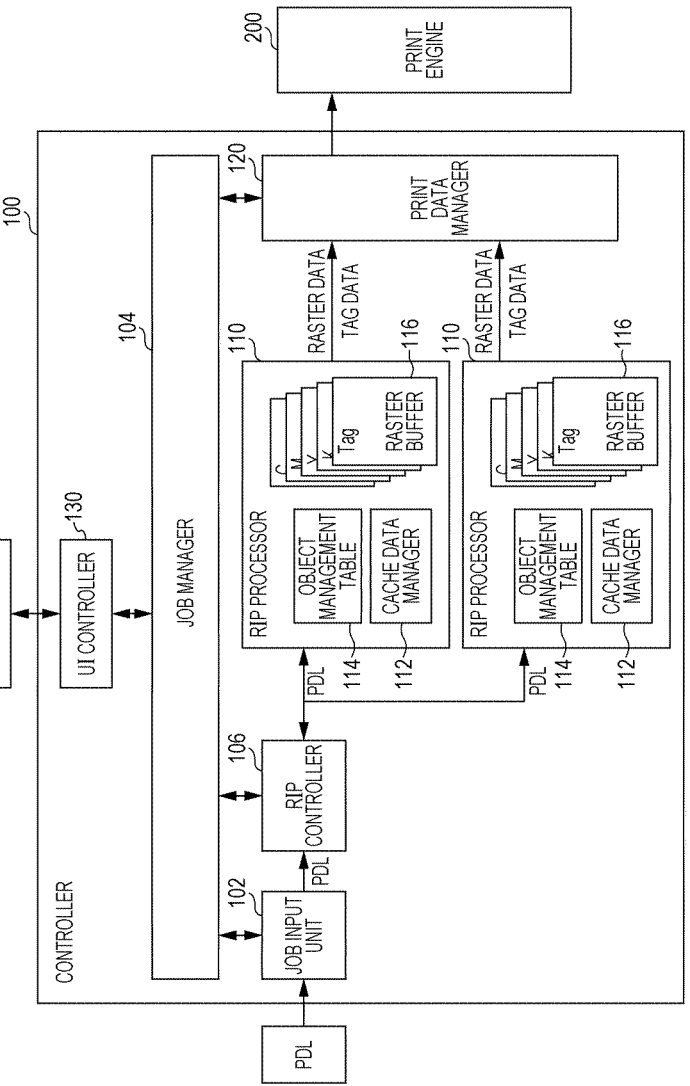
FIG. 1 illustrates an example of the system configuration according to the exemplary embodiment.

An example of the configuration of a print system according to the exemplary embodiment will be described below with reference to FIG. 1.

This print system includes a controller 100 and a print engine 200.

The controller 100 converts a job, that is, page description language (PDL) data, input from a client device, such as a personal computer (PC), into printable data. This conversion processing is called raster image processing (RIP). The printable data is data in a format which can be handled by a device that performs print processing, such as the print engine 200, disposed subsequent to a device that executes RIP processing, such as a RIP processor 110 of the controller 100 in FIG. 1. In the exemplary embodiment, the format of printable data may be a raster format or an intermediate data format, which is data between the PDL format and the raster format. The controller 100 supplies the printable data to the print engine 200 after performing, if necessary, certain processing on the printable data between the RIP processor 110 and the print engine 200. The controller 100 then controls the print engine 200 so that the print engine 200 will print the printable data on a medium, such as paper.

A user interface (UI) device 300 that provides a UI of the print system is connected to the controller 100. The UI device 300 may be a PC (for example, a client PC which instructs the print system to perform printing) connected to the controller 100 via a network, such as a local area network (LAN), or a touch panel display connected to the controller 100 via wired medium, such as a cable.

The print engine 200 prints an image indicated by printable data received from the controller 100 on a medium.

The controller 100 will be discussed below in greater detail. The controller 100 includes a job input unit 102, a job manager 104, a RIP controller 106, RIP processors 110, a print data manager 120, and a UI controller 130.

The job input unit 102 receives PDL data (also called a job) from a client device and registers the PDL data in the job manager 104.

The job manager 104 manages input jobs. Managing of input jobs includes managing of the execution order of jobs based on the queue or the priority and managing of reprinting of printed jobs. When it is time to execute a job within the queue, the job manager 104 supplies this job to the RIP controller 106 and causes the RIP controller 106 to control a RIP processor 110 so that the RIP processor 110 executes RIP processing on the job.

The RIP controller 106 controls RIP processing to be executed on a job. The RIP processing is processing for converting a job (PDL data) into printable data. More specifically, the RIP controller 106 controls one or more RIP processors 110 so that one or more RIP processors 110 will execute RIP processing. If the controller 100 includes plural RIP processors 110, it may control the RIP processors 110 so that the RIP processor 110 will execute RIP processing on one job in parallel. In this case, the RIP controller 106 allocates pages forming the job to the RIP processors 110. The allocation of pages may be performed by the top-down approach from the RIP controller 106. For example, if two RIP processors 110 execute RIP processing, the odd-numbered pages may be allocated to one RIP processor 110, and the even-numbered pages may be allocated to the other RIP processor 110. Alternatively, the allocation of pages may be performed by the bottom-up approach from the RIP processors 110. For example, every time a RIP processor 110 executes RIP processing for one page, it requests the RIP controller 106 to allocate another page to the RIP processor 110. The RIP controller 106 also supplies PDL data required for executing RIP processing for an allocated page to each RIP processor 110. If a job is described in a PDL in which only a PDL description for one page is sufficient to execute RIP processing for this page, the RIP controller 106 supplies PDL data only for the allocated page to the RIP processor 110. If a job is described in a PDL in which a PDL description for one page is not sufficient to execute RIP processing for this page, the RIP controller 106 supplies the whole PDL data of the job to each RIP processor 110. The unit for executing parallel RIP processing by the plural RIP processors 110 is not restricted to the page. Another unit, for example, a band divided from one page in the sub-scanning direction, may be used for parallel RIP processing.

The RIP processor 110 executes RIP processing for a page, for example, that the RIP controller 106 has instructed the RIP processor 110 to execute. The RIP processor 110 then generates printable data for the page and supplies the printable data to the print data manager 120. The format of the printable data generated by the RIP processor 110, that is, whether the printable data is the raster format or the intermediate data format, is determined by which one of the formats the print engine 200 supports. For the sake of simple description, the following description and illustration in FIG. 1 will be given, assuming that the printable data generated by the RIP processor 110 is raster data. For a similar purpose, it is assumed that the unit for executing parallel RIP processing by the plural RIP processors 110 is the page.

The RIP processor 110 interprets PDL data concerning an allocated page, generates items of color-plate raster data of four primary colors, for example, cyan (C), magenta (M), yellow (Y), and black (K), and writes the items of raster data into associated raster buffers 116 of the individual color plates. In the raster buffer 116 of each color plate, the density value of one pixel is represented by eight bits, for example. The use of four CMYK color plates is only an example.

The RIP processor 110 also writes information for recording the reuse of cache data into a tag plate while generating CMYK color-plate raster data. This will be discussed in detail later. The tag plate is a plate (raster buffer 116) provided separately from the CMYK color plates, and is used for performing certain control. In the exemplary embodiment, the tag plate is used for recording the situation of the reuse of cache data. Processing for writing information into this tag plate and the use of the generated tag plate data will be discussed in detail later.

The RIP processor 110 caches and reuses RIP-processed printable data (raster data in this example) indicating an object repeatedly appearing in a job and repeatedly printed. The RIP processor 110 is thus able to reduce a waste of a processing time caused by executing RIP processing many times on objects representing the same image. A cache data manager 112 is a device for storing RIP-processed data of an object to be cached (hereinafter called cache data) for reuse. The cache data manager 112 stores cache data indicating an object in a cache-data storing region, for example, allocated in a main memory of the controller 100.

The RIP processor 110 also writes information for managing the reuse of the cache data into an object management table 114 and refers to this information.

The RIP processor 110 supplies the items of raster data of the individual color plates written into the raster buffers 116 to the print data manager 120. The print data manager 120 then stores the received items of raster data of the individual color plates after compressing them, for example. The print data manager 120 supplies the stored items of raster data (after decompressing them if they have been compressed) to the print engine 200 in accordance with the progress of print processing in the print engine 200.

The UI controller 130 generates a screen to be displayed by the UI device 300, and obtains an instruction or data input on the screen by a user into the UI device 300 and supplies the instruction or the data to the job manager 104.

Figure 2:
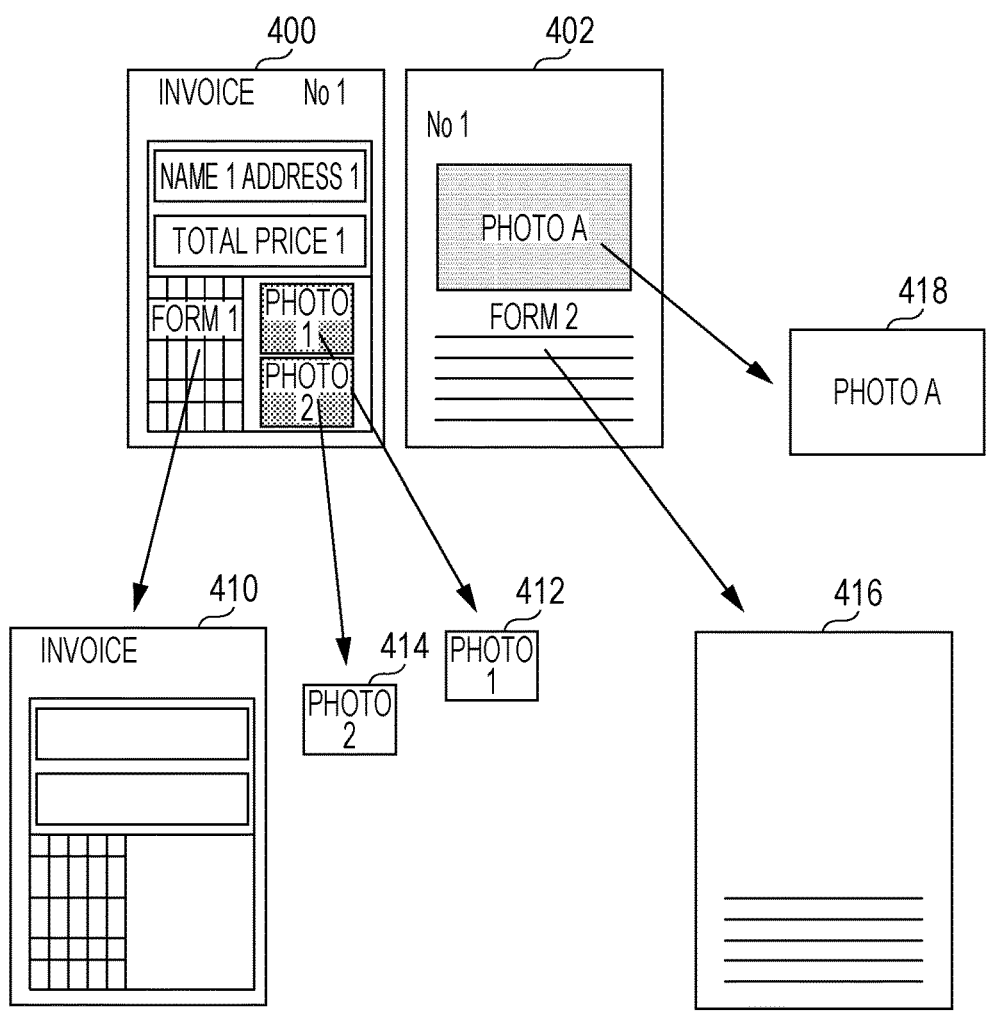
FIG. 2 schematically illustrates a two-page invoice as a specific example of a job printed by the system according to the exemplary embodiment.

A specific example in which a variable-data-printing job of a two-page invoice shown in FIG. 2 is executed in the print system shown in FIG. 1 will be discussed below.

The invoice shown in FIG. 2 is constituted by a first page 400 and a second page 402.

The first page 400 includes, as reusable objects, a first form (standard data) 410 having tables, borders, gridlines, and a document title ("invoice") and two photos 412 and 414 (indicated as "photo 1" and "photo 2" in FIG. 2). These three reusable objects are repeatedly used for plural invoices printed in the same variable-data-printing job. The first page 400 also includes individual objects unique to each invoice such as the invoice number (indicated as "NO. 1" in FIG. 2), the name and the address (indicated as "name 1 and address 1" in FIG. 2), the total price (indicated as "total price 1" in FIG. 2), and the field names and the prices (not shown) of individual invoice items within the tables and the borders. These individual objects vary according to the invoice.

The second page 402 includes, as reusable objects, a second form 416 representing the borders at the lower portion of the page and one photo 418 (indicated by "photo A" in FIG. 2). The second page 402 also includes, as individual objects unique to each invoice, a message (not shown) written along the borders in the second form 416.

When executing an invoice print job, the RIP processor 110 reads these individual objects unique to each invoice from a specified invoice database, and combines the individual objects with the reusable objects such as the first and second forms 410 and 416 and the photos 412, 414, and 418, thereby generating the first page 400 and the second page 402.

Figure 3:
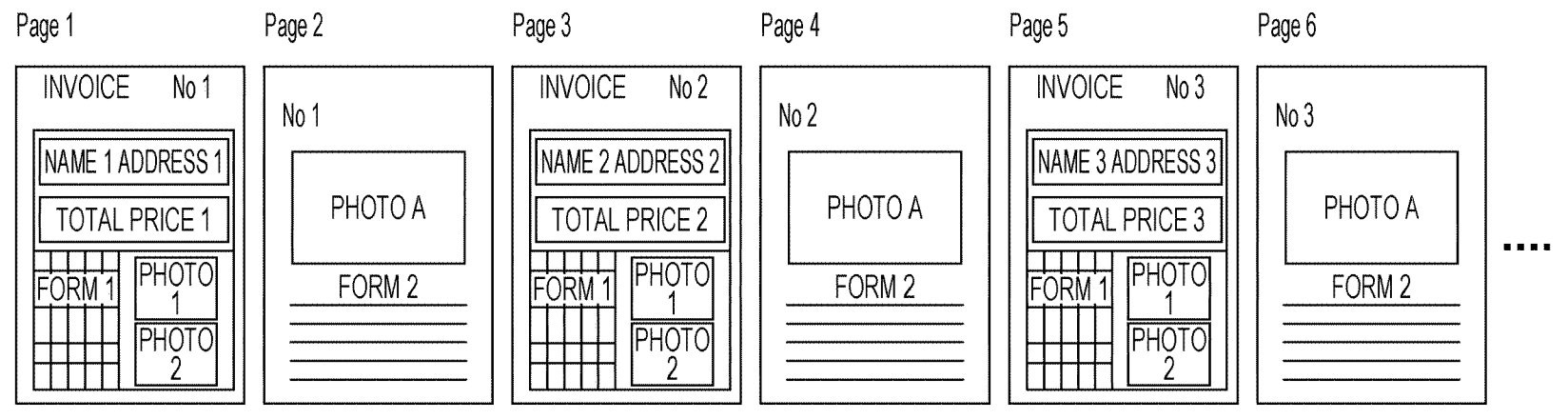

FIG. 3 schematically illustrates printing results generated by executing this job. As shown in FIG. 3, two-page invoices are sequentially printed. In these two-page invoices, items of information concerning the invoice number, the name and the address, and the total price are replaced for each invoice. In the example in FIG. 3, the first form 410, the photos 412 and 414, the second form 416, and the photo 418 are printed in all the invoices.

The content of data in the object management table 114 will be discussed below with reference to FIG. 4.

As shown in FIG. 4, for each object to be managed, the object management table 114 includes fields "object ID" "object name", "type", "ID code", "document ID", "cache data address", "cache data size", "usage times", "page number in which cache is used", and "page number in which cache is not used", which will be discussed in detail below.

Objects to be managed in the object management table 114 are reusable objects among the objects in a job. Reusable objects are predetermined some types of objects. If PostScript (registered trademark) is used as a PDL, for example, an object described with a command "execform", which is a command to draw a form object, is an example of reusable objects. If Portable Document Format (PDF) is used as a PDL, for example, an external object of an image (raster image) called "ImageXObject" and a form object are examples of reusable objects. Typically, raster images such as photos and forms constituted by line drawings and character strings, for example, are treated as reusable objects.

In the object management table 114, "object ID" represents identification information concerning each object registered in the object management table 114. The object ID is provided by the RIP processor 110.

"Object name" represents identification information concerning each object in a job and is presented to a user. If an object of the "ImageXObject" format included in a job of the PDF format is drawn, an identification name is assigned to this object and a character string generated by adding "I_" to this identification name is used as the object name. The RIP processor 110 sequentially processes PDL data of a job line by line, and accordingly changes the internal state variables (for example, the graphics state of PostScript) of the RIP processor 110. The RIP processor 110 then processes a drawing command in PDL data in accordance with the internal state variables. As a result, the RIP processor 110 generates a raster image. Even for objects having the same object name, if the internal state variables of the RIP processor 110 when drawing one object are different from those when drawing the other object, different raster images are generated. Thus, the same object (that is, the same object name) in the PDL may be treated as different objects (that is, different object IDs) in the object management table 114 if the internal state variables of the RIP processor 110 when drawing one object are different from those when drawing the other object.

"Type" represents the type of reusable object. Although the object management table 114 in FIG. 4 shows two types, "Image" (raster images such as photos) and "Form" (form), another type may also be included.

"ID code" represents identification information concerning a drawn object. The identification information is generated based on a combination of content information concerning this object and the internal state variables of the RIP processor 110 when drawing this object. As the ID code, a hash value of a data sequence generated by merging content information concerning the object with a set of internal state variables may be used. The content information indicates, for example, a form dictionary and an image dictionary included in an object and size information concerning this object. A set of internal state variables used for generating the ID code may be registered in the object management table 114 as key information for specifying the object, though they are not shown in FIG. 4. Examples of the internal state variables are a coordinate transformation matrix, various drawing attributes (such as the line width, line cap, and line join), clip information (a path or a mask which defines a portion of an image to be clipped and printed), and color information.

"Document ID" represents the ID of a document (PDL data) including an object. The same document ID is used for objects included in the same job.

"Cache data address" represents the address of the storage location of the RIP-processed data (cache data) of each object in the cache data manager 112.

"Cache data size" represents the size of the cache data of each object.

"Usage times" represents the number of times the cache data of each object has been used.

"Page number in which cache is used" is a list of page numbers in which the cache data of an object has been used among the pages of the job.

"Page number in which cache is not used" is a list of page numbers in which the cache data of an object has not been used among the pages of the job.

The fields of the object management table 114 shown in FIG. 4 are only examples. Other fields such as the size (the number of pixels) and the coordinates of the drawing region of an object and the time taken to execute RIP processing on this object may also be recorded in the object management table 114.

The tag plate will be described below with reference to FIGS. 5 and 6.

FIG. 5 illustrates an example of the bit allocation for data concerning one pixel of the tag plate. One pixel of the tag plate is constituted by eight bits of bits 0 to 7. Among the eight bits, the three bits of bits 0 to 2 represent the object type. An example of the representation of the bit string of each object type is shown in FIG. 6. The object type of a pixel of a character object is represented by "010". The two bits of bits 3 and 4 represent color information (information concerning a color space such as RGB and CMYK). Bit 5 represents whether this pixel is a spot color. The spot color is a special color, which is not a process color such as CMYK. Bit 6 is unused in this example. Bit 7, which is the final bit, represents whether cache data has been reused for drawing this pixel.

An example of the process executed by the RIP processor 110 will be described below with reference to FIG. 7.

In step S10, the RIP processor 110 sequentially analyzes PDL data from the head concerning a page allocated to the RIP processor 110. While analyzing the PDL data, every time an object is detected, the RIP processor 110 determines in step S12 whether this object is a reusable object. If this object is not a reusable object, the RIP processor 110 draws this object in step S14. More specifically, the RIP processor 110 interprets a description of the PDL data for this object and writes the resulting pixel values of this object into the raster buffers 116 of the CMYK color plates. For example, the object of a character string which is variable for each invoice, such as the name and the address, is not a reusable object. The result of step S12 is thus NO, and the object is drawn in step S14.

After step S14, the RIP processor 110 determines in step S34 whether all the objects in a job have been processed. If not all the objects have been processed, the RIP processor 110 returns to step S10 and analyzes the next object.

If the RIP processor 110 determines in step S12 that the detected object is a reusable object, it determines in step S16 whether this object has been registered in the object management table 114. In step S16, the RIP processor 110 may generate an ID code from the content information concerning this object and the internal state variables of the RIP processor 110, and may search the object management table 114 for an entry having the same ID code. If such an entry has been found in the object management table 114, the result of step S16 is YES. If such an entry has not been found in the object management table 114, the result of step S16 is NO. If the result of step S16 is NO, the RIP processor 110 draws this object in step S18. In step S20, the RIP processor 110 creates an entry for this object in the object management table 114 and registers various items of information in the object management table 114. At this time point, cache data of this object has not been registered in the cache data manager 112. Items of information concerning this object to be registered in the object management table 14 are thus "object ID", "object name", "type", "ID code", "document ID", and "page number in which cache is not used" among the fields of the object management table 114 shown in FIG. 4. In the field "page number in which cache is not used", the page number including this object is added. Cache data of this object has not been generated at this time point, and thus, the page number including this object is added to "page number in which cache is not used".

Figure 7:
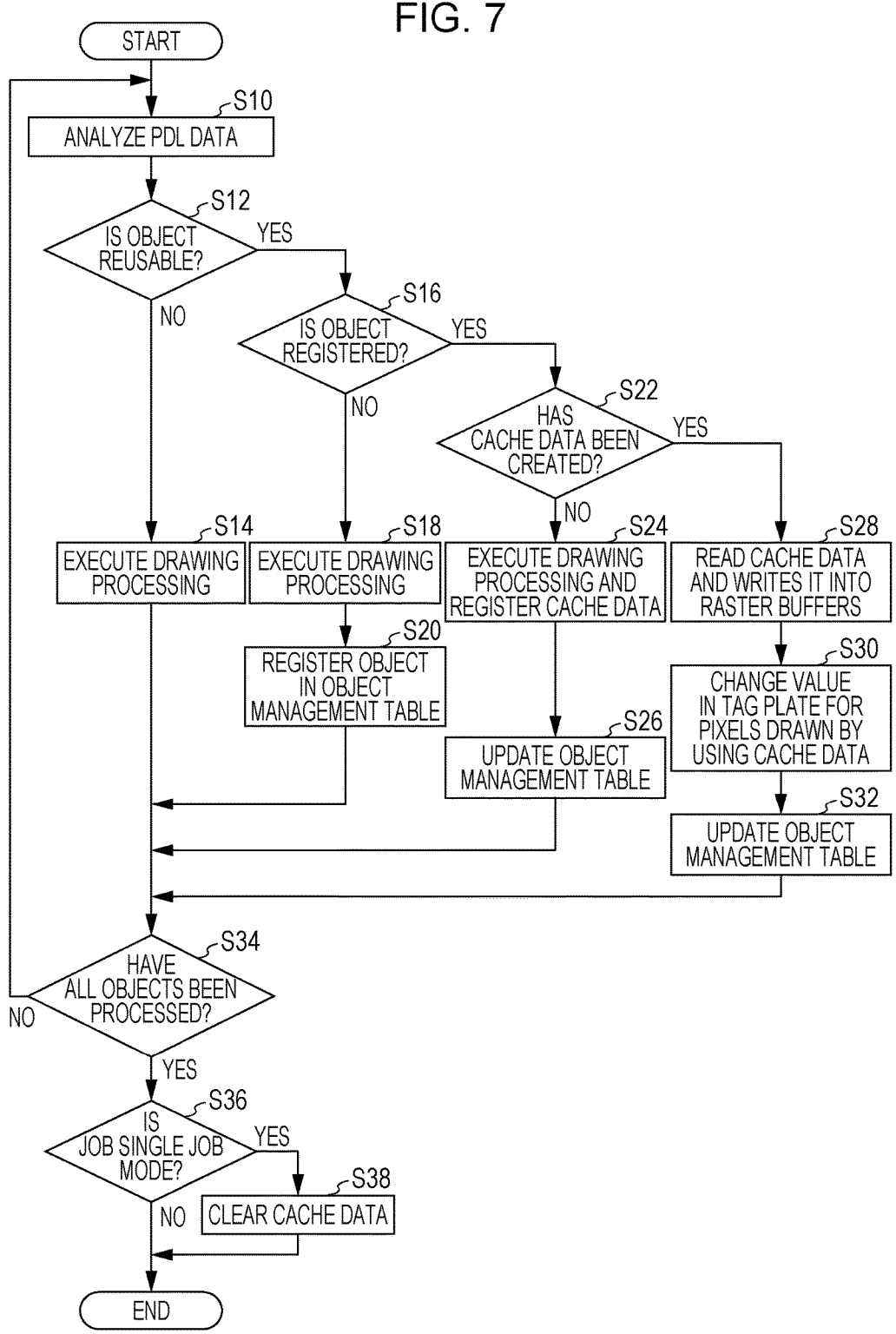
FIG. 7 is a flowchart illustrating an example of the process executed by a raster image processing (RIP) processor.

In this manner, in the process shown in FIG. 7, when a reusable object is detected for the first time, cache data of this object is not registered in the cache data manager 112. This is because, usually, a reusable object is actually used only once in a job, that is, a reusable object is not reused. It takes a certain amount of time to create cache data and requires a memory space for registering the cache data in the cache data manager 112. To avoid a waste of the time and the memory space, when a reusable object is detected for the first time, cache data of this object is not created nor is it registered.

After step S20, the RIP processor 110 determines in step S34 whether all the objects in the job have been processed. If not all the objects have been processed, the RIP processor 110 returns to step S10 and analyzes the next object.

When the same reusable object has appeared for the second or subsequent time (when the reusable object having the same ID code has been found in the object management table 114), the result of step S16 becomes YES. If the result of step S16 is YES, that is, if the object has been registered in the object management table 114, the RIP processor 110 determines in step S22 whether cache data of this object has been created, that is, whether the cache data has been registered in the cache data manager 112. If values are registered in the fields "cache data address" and "cache data size" in the object management table 114, the result of step S22 becomes YES. If values are not registered in these fields, the result of step S22 becomes NO. When the same reusable object has appeared for the second time (when the reusable object having the same ID code has been found in the object management table 114), cache data of this object has not yet been created. The result of step S22 is NO.

If the result of step S22 is NO, in step S24, the RIP processor 110 draws this object and registers the resulting raster data in the cache data register 112. Then, in step S26, the RIP processor 110 updates the entry of this object in the object management table 114. That is, the RIP processor 110 records the address of the storage location of the raster data (cache data) in the cache data manager 112 and the data size of the raster data in "cache data address" and "cache data size" for this object in the object management table 114. The RIP processor 110 also increments "usage times" for the cache data of this object by one, and adds the page number including this object to "page number in which cache is used". This object is drawn from PDL data and is not generated by reusing the cache data. However, the cache data of this object is created for reusing this object later. In terms of this point, the page number including this object is added to "page number in which cache is used".

After step S26, the RIP processor 110 determines in step S34 whether all the objects in the job have been processed. If not all the jobs have been processed, the RIP processor 110 returns to step S10 and analyzes the next object.

When the reusable object of the same ID code has appeared for the third or subsequent time, the result of step S22 becomes YES. If the result of step S22 is YES, instead of processing the PDL data for this object, in step S28, the RIP processor 110 reads the cache data of this object from the cache data manager 112 and writes the cache data into the raster buffers 116 of the CMYK color plates. That is, the RIP processor 110 reads data of a data size indicated by "cache data size" from the memory address indicated by "cache data address" for this object in the object management table 114, and writes the data into the raster buffers 116 of the CMYK color plates. In this manner, in the process shown in FIG. 7, when a reusable object of the same ID code has appeared for the third or subsequent time, this reusable object is drawn by using the cache data.

In step S30, concerning the pixels of the object for which the cache data has been written into the raster buffers 116 in step S28 among the pixels in the raster buffer 116 of the tag plate, the RIP processor 110 changes the value of bit 7 of the tag plate (see FIG. 5) from "0" (cache data has not been used) to "1" (cache data has been used). Bit 7 in the tag plate is initialized to "0" for all the pixels at the start of a job, and is changed to "1" for pixels which are drawn by the reuse of cache data even if it is only once.

After step S30, in step S32, the RIP processor 110 updates the object management table 114. That is, the RIP processor 110 increments "usage times" for the cache data of this object by one, and adds the page number including this object to "page number in which cache is used".

After step S32, the RIP processor 110 determines in step S34 whether all the objects in the job have been processed. If all the objects have not been processed, the RIP processor 110 returns to step S10 and analyzes the next object.

As a result of repeating the above-described processing, if the RIP processor 110 determines in step S34 that all the objects in the job have been processed, it determines in step S36 whether the execution mode of the current job is a single job mode. The single job mode is a mode in which after executing a job, data in this job will not be printed any more. In this case, upon completing the execution of this job, data concerning this job and cache data created when executing this job are deleted. If the execution mode of the current job is not a single job mode, data concerning this job and cache data are stored for the next printing. A determination as to whether the execution mode of the current job is a single job mode may be made based on whether the user has specified the single job mode by using the UI device 300 at the start of the execution of the job.

If the RIP processor 110 determines in step S36 that the execution mode of the current job is a single job mode, in step S38, it deletes the cache data created during the execution of the job and stored in the cache data manager 112. In this case, the RIP processor 110 also deletes the entry for this object in the object management table 114. Then, the process has been completed.

If the RIP processor 110 determines in step S36 that the execution mode of the current job is not a single job mode, the cache data created in this job may be reused in another job. The RIP processor 110 thus skips step S38. Then, the process has been completed. In this case, the cache data created during the execution of the job and the entry in the object management table 114 remain. When performing reprinting in another job, the RIP processor 110 searches the object management table 114 for the entry having the same document ID as that of the job used for reprinting, and then searches for the cache data corresponding to each of the reusable objects in this job.

The process shown in FIG. 7 focuses on recording concerning the use of cache data of an object. Thus, as a step of writing data into the tag plate, only step S30 after the use of cache data in step S28 has been discussed. However, in the tag plate, the other bits (for example, bits other than bit 7 in FIG. 5) are determined regardless of whether cache data has been used. Thus, after steps S14, S18, S24, and S28, the RIP processor 110 writes the values of the bits (bits 0 to 2, bits 3 and 4, and bit 5 in FIG. 5) of the pixels in the tag plate corresponding to the drawn object in accordance with the attributes of this object, although such writing steps are not shown in FIG. 7.

The process shown in FIG. 7 has been discussed above.

Figure 8:
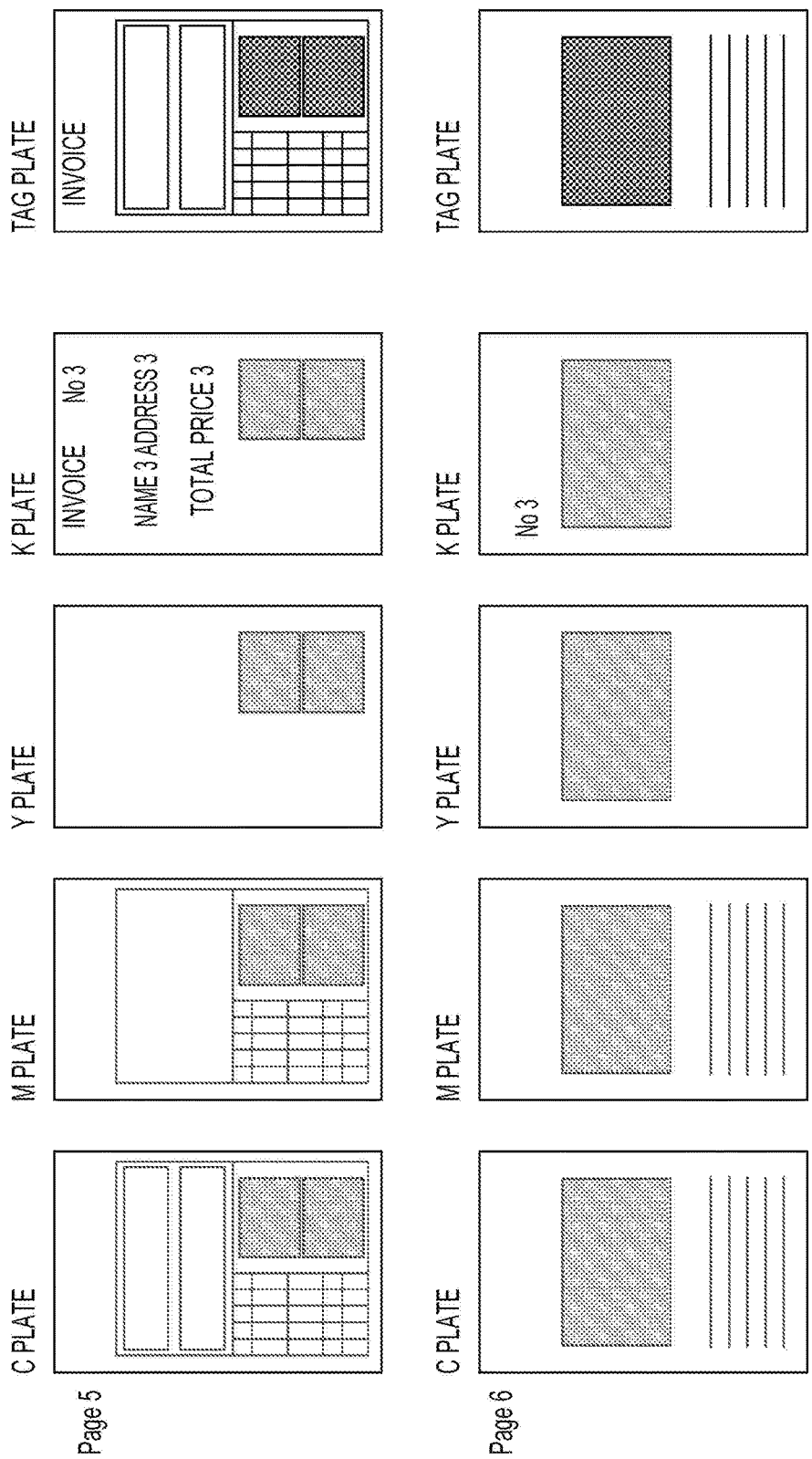
FIG. 8 illustrates examples of images of CMYK plates and a tag plate of page 5 and page 6 of a job shown in FIG. 3.

Concerning the page 5 and the page 6 of the invoice job illustrated in FIG. 3, images of the individual plates created by the process shown in FIG. 7 are illustrated in FIG. 8. The upper section in FIG. 8 indicates the images of the individual plates of the page 5, while the lower section in FIG. 8 indicates the images of the individual plates of the page 6. The images of the tag plate shown in FIG. 8 are formed by focusing only on bit 7 (whether cache data has been reused).

In the process in FIG. 7, only when cache data is used for drawing an object (step S28), has "1" been set in bit 7 of the pixels in the tag plate corresponding to this object. However, "1" may be set in bit 7 of the pixels in the tag plate corresponding to this object when cache data of this object is created (step S24). This is based on the concept that creating of cache data may also be considered as using of cache data.

In the process in FIG. 7, regarding bit 7 (whether cache data has been used) in each pixel in the tag plate, if cache data is used for even one object including a certain pixel in a job, bit 7 of this pixel is set to be "1" (cache data has been used). Thus, checking bit 7 in the tag plate allows a user to identify which pixels have been drawn by using cache data.

However, this is only an example. If an object including a certain pixel is drawn by using cache data and is then overwritten by another object without using cache data, bit 7 of this pixel in the tag plate may be reset to "0". In this case, after step S14 in FIG. 7, the RIP processor 110 resets the values of bit 7 of the pixels in the tag plate corresponding to the pixels drawn in step S14 to "0".

Typically, the process in FIG. 7 is executed for printing data represented by a job on a medium. In another example, the process in FIG. 7 may be executed, and the resulting items of RIP-processed data of the individual pages of the job may be accumulated without printing the data on a medium. Then, the accumulated items of RIP-processed data may be printed later in response to an instruction from a user. The user may specify a portion of a job (for example, a predetermined number of first pages of a job) and may instruct the controller 100 to execute the process in FIG. 7 on the specified portion from the UI device 300.

In the exemplary embodiment, to generate a checking screen for the usage situation of cache data, which will be discussed below, the job manager 104 stores items of raster data of the CMYK plates and the tag plate of each page of a job generated in the process in FIG. 7 in association with the identification information concerning this job (for example, the document ID in FIG. 5). Storing of the items of raster data of the CMYK plates and the tag plate of all pages of a job requires a huge amount of storage space. Thus, the items of raster data of the CMYK plates and the tag plate of only certain pages specified by the user may be stored.

In response to a request from the user, the UI controller 130 generates a checking screen for analyzing the usage situation of cache data concerning each page by using the CMYK plates and the tag plate of each page of a job stored in the job manager 104, and displays the generated checking screen on the UI device 300.

Figure 9:
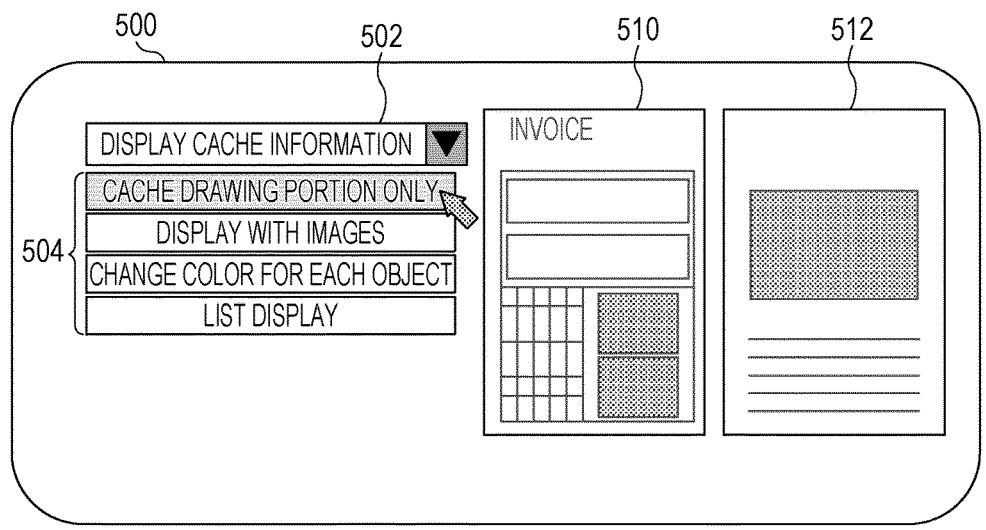
FIG. 9 illustrates an example of a checking screen generated from a tag plate.

FIG. 9 illustrates an example of the checking screen generated by the UI controller 130. More specifically, FIG. 9 schematically illustrates a checking screen 500 concerning the page 5 and the page 6 of the invoice job shown in FIG. 3. The checking screen 500 is displayed, for example, as a result of the user calling a home screen for analyzing the usage situation of cache data from a menu screen (not shown) displayed on the UI device 300 via the UI controller 130 and specifying the page 5 and the page 6 as pages to be displayed. In this case, a job to be displayed has been specified.

The checking screen 500 in FIG. 9 includes a selection field 502 for selecting display items. The selection field 502 is formed as a pulldown menu, and clicking a pulldown button at the right of the selection field 502 displays options as display items in a menu. The example in FIG. 9 shows a state in which, among the options, default "display cache information" has been selected. "Display cache information" means that a portion of the specified pages (the page 5 and the page 6 in the display example in FIG. 9) which is drawn by using cache data is displayed.

"Display cache information" in FIG. 9 includes four display modes 504 "cache drawing portion only", "display with images", "change color for each object", and "list display". FIG. 9 shows the checking screen 500 when "cache drawing portion only" is selected among the four modes 504. A fifth page 510 and a sixth page 512 are displayed in this mode in a preset color as a region drawn by using cache data as a result of selecting the pixels only for which bit 7 in the tag plate of the corresponding pages is "1".

Figure 10:
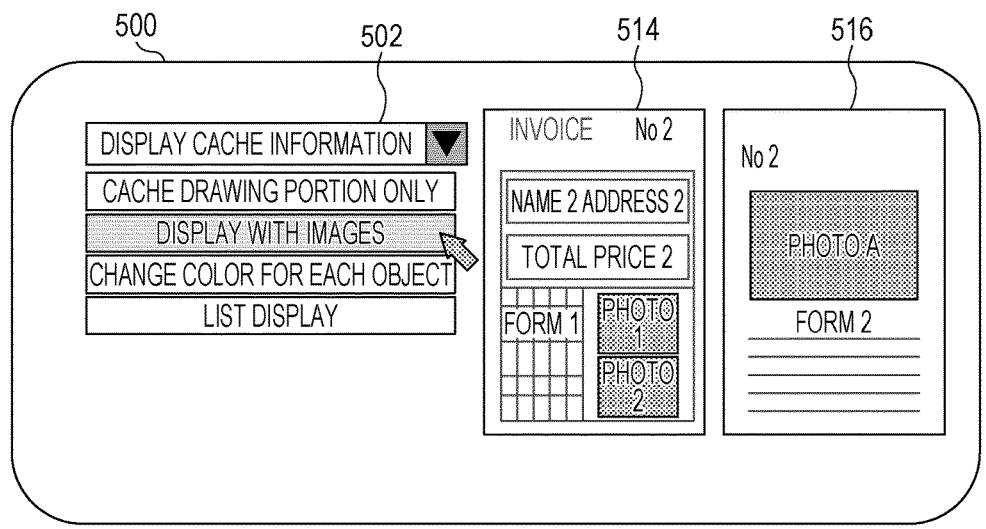
FIG. 10 illustrates an example of a checking screen when a "display with images" mode is selected.

FIG. 10 shows the checking screen 500 on which a fifth page 514 and a sixth page 516 are displayed when "display with images" is selected. In this mode, concerning the page 5 and the page 6 of the job, the UI controller 130 superposes, in a preset color, the pixels for which bit 7 in the tag plate of the corresponding pages is "1" on the combined raster images obtained from the CMYK plates of the corresponding pages. The fifth page 514 and the sixth page 516 are generated in this manner.

Figures 11, 12:
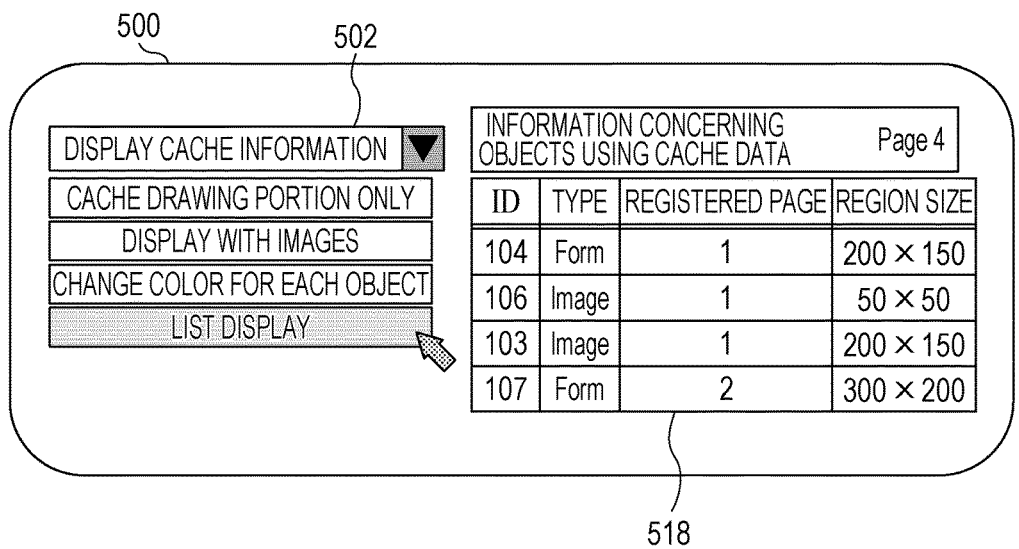
FIG. 11 illustrates an example of the bit allocation of a tag plate when a "change color for each object" is selected.
FIG. 12 illustrates an example of a checking screen when a "list display" mode is selected.

To select the "change color for each object" mode, the user specifies this mode for the job manager 104 before starting RIP processing. Then, when starting to execute a job, the job manager 104 instructs each RIP processor 110 to execute processing in the "change color for each object" mode. When executing RIP processing, the RIP processor 110 writes data into eight bits of each pixel in the tag plate according to the bit allocation shown in FIG. 11. The bit allocation shown in FIG. 11 is different from the normal bit allocation shown in FIG. 5 in bit 6 and bits 0 to 2. In the bit allocation in FIG. 11, bit 6, which is unused in the bit allocation in FIG. 5, is turned ON ("1"). Turning ON bit 6 in the tag plate means that the display mode is the "change color for each object" mode. While bits 0 to 2 in the bit allocation in FIG. 5 represent the object type, bits 0 to 2 in the bit allocation in FIG. 11 represent the lower three bits of the object ID of the object including this pixel. That is, in this mode, a maximum of eight objects can be identified by bits 0 to 2 of a pixel of the tag plate. When executing RIP processing, every time the RIP processor 110 draws an object and writes it into the CMYK raster buffers 116, it writes the lower three bits of the object ID of this object into bits 0 to 2 of each of the pixels in the tag plate included in the object.

It is now assumed that the user has selected the "change color for each object" mode on the checking screen 500 (see, for example, FIG. 9). In this case, concerning a pixel of the tag plate of the page to be displayed, if the value of bit 6 is "1" and the value of bit 7 is "1" (cache data has been used), the UI controller 130 displays this pixel in a preassigned color corresponding to the value of the three bits of bits 0 to 2. In this mode, in the case of the two-page invoice shown in FIG. 2, five objects, that is, form 1, form 2, photo 1, photo 2, and photo A, drawn by using cache data are displayed in different colors on the checking screen.

The reason why, in the case of the use of the "change color for each object" mode, the bit allocation in the tag plate is changed from the normal bit allocation is that the bit width of the tag plate is eight bits. With eight bits, it is not possible to add the lower three bits of the object ID to the eight-bit tag plate of the normal bit allocation shown in FIG. 5. Alternatively, the bit width of the tag plate may be increased to sixteen bits, for example, and then, all the necessary items including the object type and the lower several bits of the object ID may be written into the tag plate. Such a tag plate may contain items such as "caching not applicable", "reason why caching is not applicable", and "region causing caching not to be applicable" shown in FIG. 14, which will be discussed later.

FIG. 12 illustrates the checking screen 500 when the "list display" mode is selected. In this mode, the user specifies one page in a job to be displayed in a list. Then, the UI controller 130 obtains data in the entries corresponding to this page of this job from the object management table 114, and displays a table 518 indicating one or more predetermined fields of the entries. The table 518 shown in FIG. 12 indicates the type, the registered page, and the region size of each of the objects included in the page 4 of the job among the objects registered in the object management table 114. The registered page indicates a page number of the object when the cache data of this object is registered in the cache data manager 112. The region size indicates the number of pixels in rows and columns of a bounding box of this object. It is assumed that, when registering the cache data of this object in the cache data manager 112, the RIP processor 110 obtains the registered page and the region size and registers them in the object management table 114, though such items are not shown in FIG. 4.

In the selection field 502 on the checking screen 500, the "print cache information" (not shown) mode may be selected from a pulldown menu. If this mode is selected, the UI controller 130 generates PDL data for printing from the image data indicating the images of the pages 510 through 516 (FIGS. 9 and 10) and the table 518 (FIG. 12) on the checking screen 500, and registers the PDL data in the job manager 104 as a job of an attribute different from a normal job. The job manager 104 then supplies this job to the RIP controller 106. Then, the image indicating the usage situation of cache data of each page displayed on the checking screen 500 is printed from the print engine 200.

When "print cache information" is selected, as in "display cache information", the user selects one of the four modes 504, and the page or the table displayed on the checking screen 500 is printed in the selected mode.

In the above-described example, a portion drawn by using cache data stored in the cache data manager 112 is recorded in the tag plate (step S30 in FIG. 7), and the image is displayed by referring to such a portion in the tag plate (see FIGS. 9 and 10). There may be a case in which cache data stored in the cache data manager 112 is not reused. Identifying of such a portion may improve a job (PDL data).

To achieve this, in addition to the bit indicating whether cache data has been reused (bit 7 in FIG. 5), a bit indicating whether cache data has been created and registered may be provided in the tag data (see FIG. 5). For this purpose, the unused bit 6 in FIG. 5 may be used. Such a bit will be called a cache creation bit.

In this example, in the process in FIG. 7, when registering cache data of an object in the cache data manager 112 in step S24, the RIP processor 110 sets "1" in the cache creation bit in the tag data for each of the pixels corresponding to the cache data. The initial value of the cache creation bit is "0" indicating that cache data has not been created.

In this example, the checking screen generated by the UI controller 130 may include a "cache unused portion" mode or a "cache situation" mode.

When the "cache unused portion" mode is selected, the UI controller 130 generates image information by drawing pixels for which the cache creation bit in the tag plate is "1" and bit 7 (whether cache data has been reused) is "0" in a predetermined display mode (for example, a certain color), and provides this image information to the UI device 300. In this mage information, the pixels for which bit 7 is "1" are set to be colorless, as well as the pixels for which the cache creation bit is "0".

When the "cache situation" mode is selected, the UI controller 130 generates image information indicating pixels for which bit 7 (cache data has been reused) in the tag plate is "1" in a first display mode (for example, a specific color) and pixels for which the cache creation bit is "1" and bit 7 is "0" in a second display mode (for example, another color) different from the first display mode, and provides this image information to the UI device 300. This image information allows the user to visually distinguish portions for which cache data has been created but has not been reused from portions for which cache data has been created and reused.

In addition to the "cache unused portion" and "cache situation" modes, there may also be a mode in which image information generated by drawing pixels for which cache creation bit is "1" is displayed in a certain display state and is provided to the UI device 300. The image information generated in this mode represents a set of pixels included in the created cache data.

In the above-described example, when the same reusable object appears in a job multiple times, the RIP-processed data concerning this object is cached and reused. However, there may be a case in which, in terms of the overhead for generating cache data and registering it, it is better to create raster data from PDL data whenever necessary rather than caching RIP-processed data of a reusable object. A reusable object of a very small size is an example of such a case. By considering such a case, when processing a reusable object, the RIP processor 110 compares the size of the reusable object with a preset threshold, and if the size of the reusable object is smaller than the threshold, the RIP processor 110 does not create nor reuse cache data, but executes RIP processing on PDL data.

A reusable object, such as a form, may include a portion using a spot color or a transparency effect (hereinafter simply called "a spot color"). When RIP processing is executed, a portion using a spot color blends with the color of the pixels of the base under this portion. That is, the color of this portion blends with the color of the base at a specified ratio. Because of this blending processing, it is not possible to reuse cache data of the entire object including the portion using a spot color. To deal with such a situation, in one example, concerning an object including a portion using a spot color, the RIP processor 110 does not register RIP-processed cache data concerning this object in the cache data manager 112 nor does it reuse such cache data even if it is a reusable object. In another example, concerning an object including a portion using a spot color without image data under this portion, the RIP processor 110 registers and reuses cache data concerning this object. Thus, only when a reusable object including a portion using a spot color has image data under this portion, does the RIP processor 110 determine that cache data concerning this object will not be reused.

Figure 13:
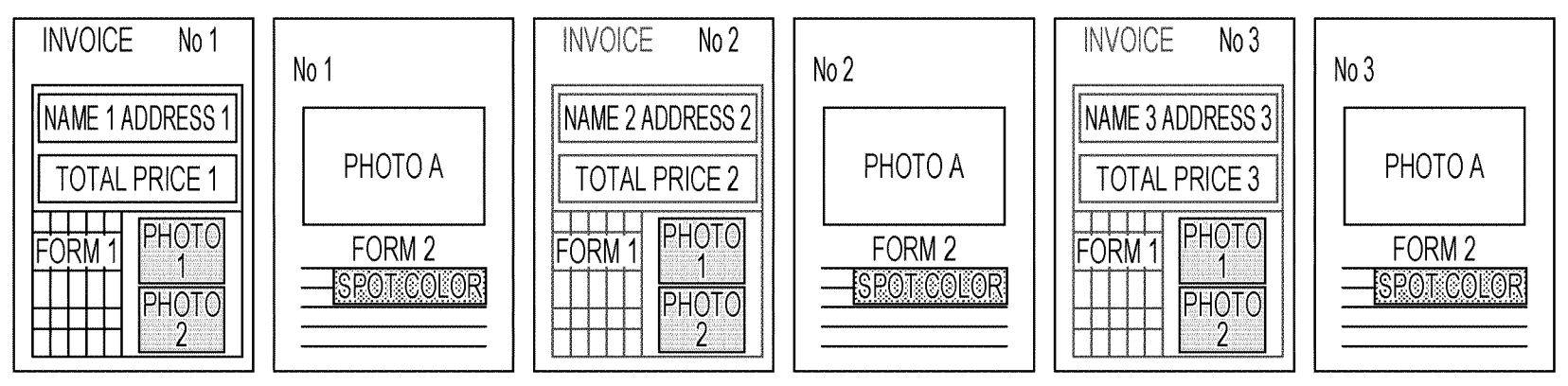

In a variable-data-printing job shown in FIG. 13, form 2 includes a portion using a spot color. Thus, caching is not applicable to the entirety of form 2.

To allow the user to understand that cache data has not been reused because, for example, the size of a reusable object is very small or a reusable object includes a portion using a spot color, in one example, the bit allocation in a tag plate is changed from the normal bit allocation. An example of the bit allocation in the tag plate in such a case is shown in FIG. 14. In this bit allocation, bit 6 indicates "caching not applicable", and the three bits of bits 0 to 2 are used for indicating the reason why caching is not applicable. Examples of the three-bit codes representing the reasons why caching is not applicable are shown in FIG. 15. For example, the reason that a spot color portion is included is represented by the three-bit code "100". As discussed above, when a reusable object appears for the first time in a job, it is not registered. This reason is represented by the three-bit code "110".

In the example in FIG. 14, bit 7 is used for representing a region which causes caching not to be applicable. In the example in FIG. 13, caching is not applicable to form 2 because form 2 includes a portion using a spot color. In the tag plate, "1" is set in bit 6 for all the pixels of form 2, and "1" is set in bit 7 only for pixels of the portion using a spot color. If caching is not applicable because of a reason concerning the entire object, such as a small size of an object or the graphic state applied to an object, "1" is set in bit 7 for all the pixels of this object.

If the RIP processor 110 determines due to one of the predetermined reasons (see, for example, FIG. 15) that caching will not be applicable to an object even though it is a reusable object, it sets "1" in bit 6 in the tag plate for each of the pixels of this object. The RIP processor 110 also sets the code representing the reason why caching is not applicable in bits 0 to 2 in the tag plate for the pixels of this object. The RIP processor 110 also sets "1" in bit 7 in the tag plate for the pixels of a region which causes caching not to be applicable.

Even if it is determined that caching is not applicable to a reusable object, information concerning this reusable object is registered in the object management table 114. For example, if it is determined that caching is not applicable to a reusable object in a certain page, the number of this page is added to "page number in which cache is not used" in the entry of this object in the object management table 114.

Figure 16:
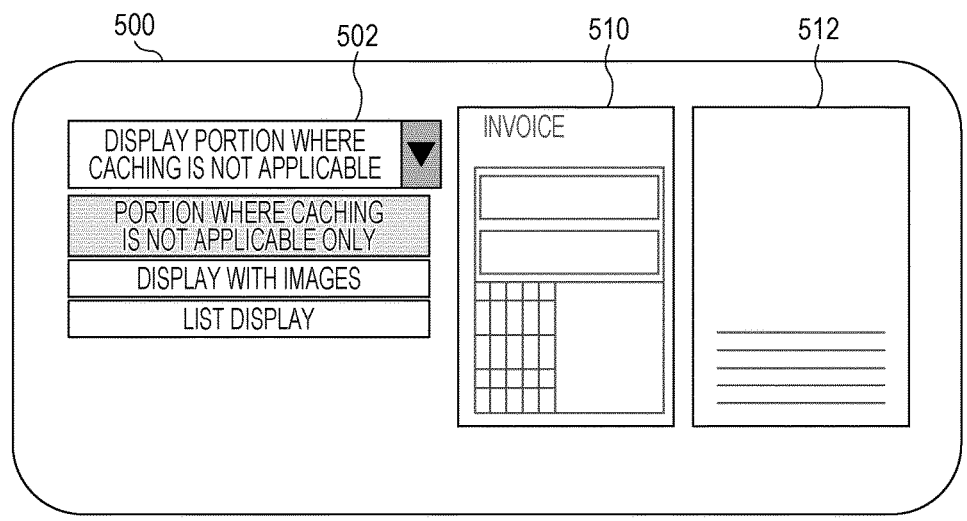
FIG. 16 illustrates an example of a checking screen when a "portion where caching is not applicable only" mode is selected.

FIG. 16 illustrates a display example of the checking screen 500 when a display menu "display portion where caching is not applicable" is selected in the selection field 502. The "display portion where caching is not applicable" menu includes three display modes "portion where caching is not applicable only", "display with images", and "list display".

Figure 17:
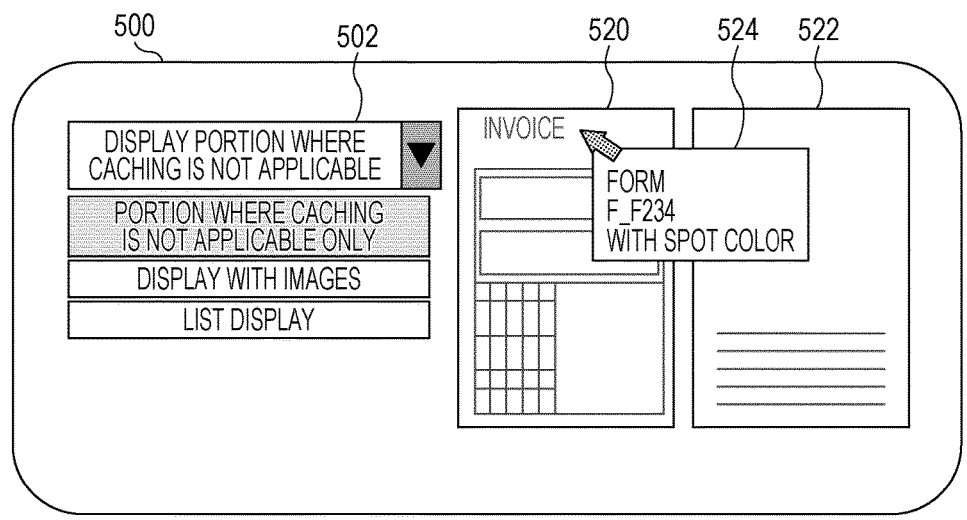
FIG. 17 illustrates an example of a state in which a reason why caching is not applicable is displayed on the checking screen shown in FIG. 16.

When the display mode "portion where caching is not applicable only" is selected, as shown in FIG. 17, pixels only for which bit 6 (caching not applicable) is "1" in the tag plate on pages 520 and 522 specified by the user are displayed in a preset color on the checking screen 500 (other pixels are displayed in white).

When the display mode "display with images" is selected, a set of pixels for which bit 6 is "1" in the tag plate in pages specified by the user are superposed on the combined raster images obtained from the CMYK plates of the corresponding pages, and the resulting image is displayed on the checking screen 500.

When the user gives an instruction to display a region which causes caching not to be applicable, the UI controller 130 highlights such a region (portion using a spot color in form 2 in the example in FIG. 13) within the pages 520 and 522 on the checking screen 500, though it is not shown in FIG. 17. Highlighting of such a region may be performed by displaying the pixels of this region in a different color from the color of the pixels of the object to which caching is not applicable.

As shown in FIG. 17, a message 524 indicating the reason why caching is not applicable may be displayed on the checking screen 500. For example, when the user touches the portion where caching is not applicable within the page 520 or 522 displayed on the checking screen 500, the UI controller 130 reads bits 0 to 2 of the pixels in this portion and displays the message 524 indicating the reason corresponding to the value of bits 0 to 2 on the checking screen 500. The message 524 includes, not only the reason ("with a spot color" in FIG. 17), but also the type of object ("form") and the object name ("F_F234") in which caching is not applied. The type of object and the object name are read from the object management table 114.

In this example, a portion where caching is not applicable is displayed on a screen. As in the case of the usage situation of cache data, a function of printing a page image indicating a portion where caching is not applicable may be provided.

In the above-described exemplary embodiment, caching and reusing of raster data has been discussed. However, the technology in the exemplary embodiment is also applicable to caching and reusing of intermediate data. Typically, the intermediate data format represents objects in the finer granularity (simple configuration or run-length) than those of PDL data. When outputting intermediate data, the RIP processor 110 appends, as tag information, control information, which is similar to that written into a tag plate of raster data, to an object in the intermediate data format. One of the free bits of this tag information is used as a bit indicating whether cache data has been used (bit 7 in FIG. 5). Control information to be recorded for the formation of images is basically the same regardless of whether the raster format or the intermediate data format is used. As the tag information appended to an object in the intermediate data format, data similar to that in the bit allocation for one pixel of a tag plate of raster data (see FIGS. 5, 11, and 14) may be used. Recording of data into tag information of intermediate data and displaying of the usage situation of cache data by referring to the recorded tag information (see FIGS. 9 and 10) are similar to those in the raster data.

The technology of the exemplary embodiment is not restricted to the above-described caching process. A check mode may be provided in which the caching situation is checked after executing RIP processing without performing print processing. A test-printing mode may be provided in which the first few pages of a large volume of job are printed, and then, the caching situation is checked. Before starting a job, the RIP processor 110 or the job manager 104 may analyze PDL data of the job, detect reusable objects appearing in the job, and generate an object management table. In this case, however, objects are not actually drawn, and thus, the cache data size and the cache data address are not determined. Then, the user may check the object management table and select an object to be cached. In this case, the user generates a checking screen, such as that shown in FIG. 9 or 10, from the tag plate and the object management table 114 that are created when the job is actually executed, and checks whether the selected object has correctly used cache data.

The above-described information processing modules of the controller 100 are implemented as a result of causing a computer to execute a program representing the above-described functions of the devices of the controller 100. The computer has a hardware circuit configuration in which a microprocessor, such as a central processing unit (CPU), memory devices (primary storage devices), such as a random access memory (RAM) and a read only memory (ROM), a controller for controlling solid-state storage devices, such as a flash memory, a solid state drive (SSD), and a hard disk drive (HDD), various input/output (I/O) interfaces, and a network interface for controlling connection with a network, such as a LAN, are connected to one another via a bus, for example. A program describing the processing content of the above-described functions is stored in a solid-state storage device, such as a flash memory, via a network, and is installed into the computer. As a result of reading the program stored in the solid-state storage device into the RAM and executing the program by the microprocessor, such as a CPU, the above-described functional modules are implemented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a converter that converts page description language data into printable data and that stores a conversion result of converting an object appearing in the page description language data a plurality of times into printable data in a storage device and reuses the conversion result for the object which appears after the conversion result has been stored, instead of converting the object into printable data;
   a reuse portion storage unit that stores information indicating a portion of a page image described by the page description language data for which the conversion result has been reused; and
   a reuse information output unit that outputs reuse information indicating a portion of the page image for which the conversion result has been reused, by using the information stored in the reuse portion storage unit.

2. The image processing apparatus according to claim 1, wherein the reuse information output unit has a function of outputting, as the reuse information, information indicating, as an image, a portion of the page image only for which the conversion result has been reused.

3. The image processing apparatus according to claim 1, wherein the reuse information output unit has a function of outputting, as the reuse information, information indicating an image obtained by superposing a portion of the page image for which the conversion result has been reused on the page image.

4. The image processing apparatus according to claim 1, wherein the reuse information output unit has a function of outputting, as the reuse information, information indicating portions for which the conversion result has been reused, the portions being displayed with different attributes according to the object to which each of the portions belongs.

5. The image processing apparatus according to claim 1, wherein:
   the converter records attribute information concerning each object to which a portion for which the conversion result has been reused belongs; and
   the reuse information output unit has a function of displaying, as the reuse information, at least one predetermined item of the attribute information as a list.

6. The image processing apparatus according to claim 1, wherein the converter does not apply storage processing for storing a conversion result of converting an object appearing in the page description language data a plurality of times into printable data in the storage device to an object which appears in the page description language data a plurality of times but which has a predetermined reason,
   the image processing apparatus further comprising:
   a processing non-applicable portion storage unit that stores information indicating a portion of a page image described by the page description language data to which the storage processing has not been applied due to the predetermined reason; and
   a processing non-applicable portion information output unit that outputs processing non-applicable portion information indicating a portion of the page image to which the storage processing has not been applied due to the predetermined reason, by using the information stored in the processing non-applicable portion storage unit.

7. The image processing apparatus according to claim 1, further comprising:
- a second storage unit that stores information indicating a portion of a page image described by the page description language data for which the conversion result has been stored by the converter in the storage device; and
- a second output unit that outputs stored portion information indicating a portion of the page image for which the conversion result has been stored in the storage device, by using the information stored in the second storage unit.

8. The image processing apparatus according to claim 1, further comprising:
- a second storage unit that stores information indicating a portion of a page image described by the page description language data for which the conversion result has been stored by the converter in the storage device; and
- a third output unit that outputs information indicating a portion of the page image for which the conversion result has been stored in the storage device but has not been reused, by using the information stored in the reuse portion storage unit and the information stored in the second storage unit.

9. The image processing apparatus according to claim 1, further comprising:
- a second storage unit that stores information indicating a portion of a page image described by the page description language data for which the conversion result has been stored by the converter in the storage device; and
- a fourth output unit that outputs information separately indicating a portion of the page image for which the conversion result stored in the storage device has been reused and a portion of the page image for which the conversion result stored in the storage device has not been reused, by using the information stored in the reuse portion storage unit and the information stored in the second storage unit.

10. A non-transitory computer readable medium storing a program causing a computer to execute a process, the process comprising:
- converting page description language data into printable data and storing a conversion result of converting an object appearing in the page description language data a plurality of times into printable data in a storage device and reusing the conversion result for the object which appears after the conversion result has been stored, instead of converting the object into printable data;
- storing reuse portion information indicating a portion of a page image described by the page description language data for which the conversion result has been reused; and
- outputting reuse information indicating a portion of the page image for which the conversion result has been reused, by using the reuse portion information.

11. An image processing apparatus comprising:
- a converter that converts page description language data into printable data and that stores a conversion result of converting an object appearing in the page description language data a plurality of times into printable data in a storage device and reuses the conversion result for the object which appears after the conversion result has been stored, instead of converting the object into printable data;
- a second storage unit that stores information indicating a portion of a page image described by the page description language data for which the conversion result has been stored by the converter in the storage device; and
- a stored portion information output unit that outputs stored portion information indicating a portion of the page image for which the conversion result has been stored in the storage device, by using the information stored in the second storage unit.

12. A non-transitory computer readable medium storing a program causing a computer to execute a process, the process comprising:
- converting page description language data into printable data and storing a conversion result of converting an object appearing in the page description language data a plurality of times into printable data in a storage device and reusing the conversion result for the object which appears after the conversion result has been stored, instead of converting the object into printable data;
- storing second information indicating a portion of a page image described by the page description language data for which the conversion result has been stored in the storage device; and
- outputting stored portion information indicating a portion of the page image for which the conversion result has been stored in the storage device, by using the second information.

13. An image processing apparatus comprising:
- a converter that converts page description language data into printable data and that stores a conversion result of converting an object appearing in the page description language data a plurality of times into printable data in a storage device and reuses the conversion result for the object which appears after the conversion result has been stored, instead of converting the object into printable data, and that does not apply storage processing for storing a conversion result of converting an object appearing in the page description language data a plurality of times into printable data in the storage device to an object which appears in the page description language data a plurality of times but which has a predetermined reason;
- a processing non-applicable portion storage unit that stores information indicating a portion of a page image described by the page description language data to which the storage processing has not been applied due to the predetermined reason; and
- a processing non-applicable portion information output unit that outputs processing non-applicable portion information indicating a portion of the page image to which the storage processing has not been applied due to the predetermined reason, by using the information stored in the processing non-applicable portion storage unit.

14. The image processing apparatus according to claim 13, wherein the processing non-applicable portion information output unit has a function of outputting, as the processing non-applicable portion information, information indicating, as an image, a portion of the page image only to which the storage processing has not been applied due to the predetermined reason.

15. The image processing apparatus according to claim 13, wherein the processing non-applicable portion information output unit has a function of outputting, as the processing non-applicable portion information, information indicating an image obtained by superposing a portion of the page image to which the storage processing has not been applied due to the predetermined reason on the page image.

16. The image processing apparatus according to claim 13, wherein:
- the converter records reason information indicating the predetermined reason in association with a portion of the page image to which the storage processing has not been applied due to the predetermined reason; and
- the processing non-applicable portion information output unit has a function of outputting, as the processing non-applicable portion information, information indicating the reason information in association with a portion of the page image to which the storage processing has not been applied due to the predetermined reason.

17. The image processing apparatus according to claim 13, wherein:
- if an object has the predetermined reason because of only a portion of the object, the converter does not apply the storage processing to the entire object, and records information indicating the portion of the object; and
- the processing non-applicable portion information output unit has a function of outputting, as the processing non-applicable portion information, information indicating the portion of the object.

18. A non-transitory computer readable medium storing a program causing a computer to execute a process, the process comprising:

- converting page description language data into printable data and storing a conversion result of converting an object appearing in the page description language data a plurality of times into printable data in a storage device and reusing the conversion result for the object which appears after the conversion result has been stored, instead of converting the object into printable data, and not applying storage processing for storing a conversion result of converting an object appearing in the page description language data a plurality of times into printable data in the storage device to an object which appears in the page description language data a plurality of times but which has a predetermined reason;
- storing second information indicating a portion of a page image described by the page description language data to which the storage processing has not been applied due to the predetermined reason; and
- outputting processing non-applicable portion information indicating a portion of the page image to which the storage processing has not been applied due to the predetermined reason, by using the second information.

* * * * *